Patented Dec. 8, 1953

2,662,060

UNITED STATES PATENT OFFICE 2,662,060

SELF-ACTIVATED ZINC SULFIDE PHOSPHORS

Ferdinand Anne Kröger, Eindhoven, Netherlands, assignor, by mesne assignments, to Hartford National Bank and Trust Company, Hartford, Conn., as trustee No Drawing. Application April 19, 1950, Serial No. 156,931

Claims priority, application Netherlands July 16, 1949

3 Claims. (Cl. 252—301.6)

My invention relates to luminescent materials, and more particularly to fluorescent materials capable of excitation by electron bombardment and/or by ultraviolet irradiation.

It is known that materials such as sulphides, selenides, or the sulphoselenides, of zinc and cadmium are very frequently used as phosphors in electric discharge devices, such as cathode ray tubes.

It is also further known that these materials when activated with heavy metals and when excited by electrons or ultraviolet radiation, radiate light the location of which in the spectrum depends upon the activators used, the proportion of the zinc, the cadmium, the sulphur and the selenium, and the manner of excitation.

It is also common to use copper, silver or gold as a means of activating these luminescent substances or materials. It is known, however, that luminescence can also be obtained without the use of an activator if the materials are prepared in the presence of a halogen. This phenomenon is known as self-activation. My present invention is concerned with self-activated materials, that is, phosphors to which no foreign metal is added as an activator.

Generally speaking, there are objections to the use of chlorides, bromides, or iodides. Halogenides when used in this capacity have two functions, namely:

(a) a crystallizing function, and (b) a compositional function, in the luminescent center of the crystal-like structure.

However, fluorides are exceptions because they perform only function (a) above. This function (a) usually causes a lowering of the firing temperature at which the material may be obtained.

The real disadvantage of the use of chlorides, bromides or iodides, lies in the fact that the quantities necessary for functions (a) and (b) are generally very different. Thus, when one chooses the maximum quantity for one of the above two functions, one does not obtain the maximum action or benefit of the other function.

It is an object of my invention to provide a new and improved luminescent material.

It is another object of my invention to provide new and improved luminescent materials capable of excitation by either cathode rays or ultraviolet irradiation, and in which a zinc or cadmium sulphide is self-activated by the employment of aluminum.

It is a still further object of my invention to provide new and improved phosphors which afford good reproducibility, and which offer improved stability when used in the presence of an electrical discharge.

Briefly stated, I provide new and improved luminescent materials, such as zinc or cadmium sulphides or selenides in which these materials are self-activated wherein trivalent aluminum ions are associated with zinc or cadmium ions. The aluminum in the above-mentioned luminescent materials is not employed as an activator.

Considering more specifically the details of my invention, I have discovered that all substances or materials made in accordance with my invention can be prepared with greater reproducibility than those obtained by the prior art, and they all evidence luminescence or fluorescence in a high degree. A luminescent material, in accordance with my invention, is made of at least one element of the sub-group in the second column of the periodic system of the elements, with an atomic number between 29 and 49, at least one element of the main group of the sixth column of the periodic system of the elements with an atomic number between 15 and 35, and with aluminum. For example, luminescent materials may be made using at least one element of each of the following groups:

(1) zinc and cadmium
(2) sulphur and selenium
(3) aluminum

By preference, the quantity of aluminum lies between $10^{-5}$ and 30 atoms per 100 atoms of zinc plus cadmium. The other elements of the luminescent material are present in quantities such as are now being used for activating selenides, sulphides or sulphoselenides of zinc and/or cadmium.

In accordance with my discovery which culminated in the present invention, it was apparent that aluminum can assume the function (b), above, of a halogen except fluorine. In accordance with the present invention, one is free to choose the maximum quantity of the halogen for function (a) to make a luminescent material for use in a discharge tube, device or lamp. Another advantage of the instant invention is that one can omit the halogenide in some cases. One may heat the materials which are used in a discharge tube or lamp in accordance with the invention to a high temperature in order to obtain the desired crystallizing condition. The use of the halogen-free composition mentioned is advantageous when parts are present in the discharge tube in which the luminescent material is applied and which are sensitive to very small amounts of halogens.

In the preparation of the luminescent materials I may use as fluxes the fluorides of aluminum, beryllium, magnesium, calcium, strontium, barium, zinc, or cadmium. Fluxes which are employed are not removed after the preparation of the material.

A few of the luminescent materials which can be used in a discharge tube or lamp in accordance with my invention are:

(1) Zinc sulphide with aluminum which has a blue luminescence with a peak at about 4600 Angstrom units.

(2) Zinc-cadmium sulphide with aluminum which, depending on the cadmium content, has a luminescence of the blue to deep red.

The luminescence of the two materials mentioned may be obtained with excitation by electrons as well as with excitation by X-rays or from ultraviolet rays.

In order to clarify further the invention, one example of methods of preparing luminescent materials is stated hereinafter.

Example

One hundred grams of zinc sulphide are mixed with 30 ccs. of a solution of aluminum nitrate (or other aluminum salt which will react with hydrogen sulphide at high temperature to form aluminum sulphide) which contains $10^{-2}$ gram atom of aluminum per liter. After it is dried through evaporation the material is well mixed and then heated for one hour in a quartz cup at 1200° C. in a hydrogen sulphide atmosphere. I have found that in the heating step temperatures ranging from 800° C. to 1400° C. may be employed. The material thus obtained will show a blue fluorescence with a peak of about 4600 Angstrom units. This is an example of a self-activated phosphor.

As stated above, irrespective of any theory advanced, it is a fact that materials made as described above have a very good fluorescence, and all such materials can be prepared with great reproducibility, which factor is of great value in the manufacture of fluorescent or luminescent materials for use in electric discharge tubes or lamps.

What I claim as new and desire to secure by Letters Patent of the United States is:

1. A luminescent material consisting of a compound selected from the group consisting of sulphides, selenides and sulpho-selenides of zinc and cadmium and about $10^{-5}$ to 30 atoms of aluminum for each one hundred atoms of zinc plus cadmium.

2. A luminescent material as claimed in claim 1 containing in addition to the elements set forth therein, a fluoride flux.

3. A method of preparing a luminescent material which consists of a sulfide of a metal selected from the group consisting of zinc and cadmium and about $10^{-5}$ to 30 atoms of aluminum for each 100 atoms of zinc plus cadmium which comprises mixing a sulfide of at least one of said metals with a solution of an aluminum salt containing about $10^{-2}$ gram-atoms of aluminum per liter in amounts equal to about $10^{-5}$ to 30 atoms of aluminum for each 100 atoms of zinc plus cadmium, drying the mixture, and heating the mixture at a temperature of about 800° to 1400° C. in an atmosphere of $H_2S$ to produce said luminescent material.

FERDINAND ANNE KRÖGER.

References Cited in the file of this patent
UNITED STATES PATENTS

| Number | Name | Date |
| --- | --- | --- |
| 2,623,857 | Kroger | Dec. 30, 1952 |
| 2,623,858 | Kroger | Dec. 30, 1952 |